(12) United States Patent
Nielsen et al.

(10) Patent No.: US 11,614,352 B2
(45) Date of Patent: Mar. 28, 2023

(54) CONSUMPTION METER WITH ULTRASONIC FLOW MEASUREMENT

(71) Applicant: Kamstrup A/S, Skanderborg (DK)

(72) Inventors: Søren Tønnes Nielsen, Skanderborg (DK); Peter Nordlund Borring, Skanderborg (DK); Peter Schmidt Laursen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 135 days.

(21) Appl. No.: 16/952,152

(22) Filed: Nov. 19, 2020

(65) Prior Publication Data

US 2021/0148741 A1 May 20, 2021

(30) Foreign Application Priority Data

Nov. 19, 2019 (DK) .......................... PA 2019 70702

(51) Int. Cl.
*G01F 1/66* (2022.01)
*G01F 1/667* (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| | | | |
|---|---|---|---|
| 3,771,117 A | 11/1973 | Shaffer et al. | |
| 6,405,761 B1 * | 6/2002 | Shimizu | B23K 20/00 |
| | | | 138/155 |
| 7,557,490 B2 * | 7/2009 | Straub, Jr. | G01F 1/662 |
| | | | 310/334 |
| 9,658,090 B2 * | 5/2017 | Nielsen | G01F 1/662 |
| 10,199,028 B2 * | 2/2019 | Ueberschlag | G01N 29/223 |
| 11,137,275 B2 * | 10/2021 | Sai | B06B 1/0644 |

(Continued)

FOREIGN PATENT DOCUMENTS

EP 3492877 A1 6/2019

OTHER PUBLICATIONS

Search Report dated May 4, 2020, for Danish Priority Application No. PA 2019 70702.

(Continued)

*Primary Examiner* — Harshad R Patel
(74) *Attorney, Agent, or Firm* — Renner, Otto, Boisselle & Sklar, LLP

(57) ABSTRACT

A consumption meter arranged to measure a flow rate of a fluid comprising: a tube with two transducer holes in a wall of the tube; a meter housing arranged at the tube, comprising two transducer housings and a main housing; first and second ultrasonic transducers arranged in the transducer housings for transmitting and receiving ultrasonic signals propagating through the fluid; a control circuit arranged in the meter housing for operating the first and second ultrasonic transducers to generate a signal according to the flow rate of the fluid. The transducer housing comprises: an internal transducer housing element arranged at an inner surface of the tube and an external transducer housing element arranged at an outer surface of the tube to extend through the transducer hole in the wall of the tube such that the transducer housing is fixated to the tube.

15 Claims, 8 Drawing Sheets

(56) References Cited

U.S. PATENT DOCUMENTS

| | | | |
|---|---|---|---|
| 11,499,853 B2* | 11/2022 | Nielsen | G01F 15/063 |
| 2010/0011867 A1* | 1/2010 | van Klooster | G01F 1/662 |
| | | | 73/644 |
| 2013/0192386 A1* | 8/2013 | Ueberschlag | G10K 11/04 |
| | | | 73/861.18 |
| 2014/0216167 A1 | 8/2014 | Nielsen | |
| 2015/0136842 A1* | 5/2015 | Allen | G01F 15/14 |
| | | | 228/219 |
| 2017/0146378 A1 | 5/2017 | Drachmann | |
| 2019/0195671 A1 | 6/2019 | Bottner et al. | |
| 2019/0226893 A1 | 7/2019 | Kuhlemann | |
| 2020/0116611 A1* | 4/2020 | Undi | G01F 1/662 |

OTHER PUBLICATIONS

European Search Report dated Apr. 19, 2021, for related European Patent Application No. 20 20 8268.

* cited by examiner

CONSUMPTION METER WITH ULTRASONIC FLOW MEASUREMENT

This application claims priority to DK Patent Application No. PA 2019 70702 filed Nov. 19, 2019, which is incorporated herein by reference.

FIELD OF THE INVENTION

The present invention relates to the field of ultrasonic consumption meters. More specifically it relates to the field of housings and mechanics of ultrasonic consumption meters, or utility meters, comprising an ultrasonic flow meter, such as ultrasonic consumption meters for measuring consumption data of a supplied utility, e.g. water, gas, heat, or cooling.

BACKGROUND OF THE INVENTION

Ultrasonic consumption meters are used for precision measurement of fluid flow in consumption meters for measuring a consumed quantity of a supplied utility (e.g. heat, cooling or water). An ultrasonic consumption meter measures transit times of ultrasonic signals so as to determine a flow rate of a fluid flowing in a flow channel by use of known operation principles for transit time flow meters.

A consumption meter may simply measure the consumed amount, e.g. a volume of water, and utility companies may base the billing of the consumers on this amount. However, for heat and cooling meters, temperature sensors are used for measuring the temperature of the fluid, whereby the consumer may be billed in accordance with energy extracted from the supplied liquid. Such ultrasonic consumption meters may be used in connection with district heating, district cooling and/or distributed water supply.

Known ultrasonic consumption meters have a housing with a control circuit inside which is electrically connected to two or more spaced apart ultrasonic transducers, e.g. piezo electric transducers. The ultrasonic transducers are mounted on the flow channel so that ultrasonic signals can be introduced into the fluid in the flow channel, by one of the ultrasonic transducers, and travel along a measuring section to be detected by the other ultrasonic transducer after the passage. The operation of the ultrasonic transducers is controlled by the control circuit, electrically connected to the transducers. Ultrasonic consumption meters in which the transducers are integrated into the meter housing are known as well.

The housing which encloses the control circuit and typically also a battery, is preferably watertight so as to avoid any humidity causing damage to the control circuit and battery inside the housing. Cables connecting the ultrasonic transducers or other external elements to the control circuits does however provide a potential channel for water entering the housing. In case of just a minor damage to the cables the cables will provide a channel allowing water to enter the meter housing. Especially water meters may submerged or operate in high humidity environments but heat and cooling meters may as well operate in humid environments.

The flow channel of prior art meters is typically a custom made element made from a metal such as brass, stainless steel or cast iron. The flow channel is often produced specifically for the meter requiring different production processes such as moulding, machining requiring various moulds and tools for each dimension of flow meters. Alternatively the flow channel is made from a prefabricated pipe having dimensions adequate for the flow meter being produced. This is especially the case for large dimension meters. The prefabricated pipe is a standard element that needs to be cut out in the right length, which eliminates the need for costly special tools and processes associated with production of the flow channel.

However, the prefabricated pipe will need to be modified to receive ultrasonic transducers, meter houses and other elements. Holes and plane mounting-seats for the transducer housings and for mounting the meter housing are required. To create a plane mounting-seat a section may be cut out of the pipe wall and a new section including a plane surface for reception of the transducer assemblies is welded in the place of the cut out section. Production of a flow channel thereby becomes an expensive process adding significantly to the total meter cost.

The flow channel often has a mounting-seat for a transducer housing. The mounting-seat may be a plane surface on the inside or outside of the flow channel or a threaded element for fixating the transducer housing. In order to introduce ultrasonic signals into a metal flow channel, the transducer housing is mounted in openings of the wall of the flow channel. Further mounting elements for mounting a meter housing, containing control circuits for the meter, are provided on the flow channel.

Consumption meters typically require a large number of individual components which complicates the assembly process. Thus prior art consumption meter housings involve complex connection structures for electrically connecting the transducers and the control circuitry of the consumption meter, such as complex wiring structures and/or separate electrically connecting elements, which complicates the assembly process. Further, it is difficult to ensure that the meter is suitable to operate in a humid environment.

Hence, an improved consumption meter would be advantageous, and in particular a more cost efficient consumption meter made from prefabricated elements would be advantageous. Especially a simple and robust method of mounting transducers and a meter housing on a prefabricated tube is desired. Further, the consumption meter is preferably robust and suitable for operation in a high humidity environment. Providing a consumption meter allowing simple and economic production methods and allowing for preproduced sub-assemblies being put together in a final step of production will be advantageous.

OBJECT OF THE INVENTION

An object of the present invention is to provide an alternative to the prior art.

In particular, it may be seen as a further object of the present invention to provide a consumption meter that solves the above mentioned problems of the prior art and improve known consumption meters in respect of production processes, robustness, component cost and water resistance.

SUMMARY OF THE INVENTION

Thus, the above described object and several other objects are intended to be obtained in a first aspect of the invention by providing a consumption meter arranged to measure a flow rate of a fluid, the consumption meter comprising: a tube comprising a through-going opening for passage of the fluid between an inlet and an outlet and with two transducer holes in a wall of the tube, a meter housing arranged at the tube, comprising two transducer housings and a main housing; first and second ultrasonic transducers arranged in the transducer housings for transmitting and receiving ultrasonic signals propagating through the fluid; and a control circuit arranged in the meter housing for operating the first and second ultrasonic transducers, and being arranged to generate a signal according to the flow rate of the fluid, wherein the transducer housing comprises: an internal transducer housing element arranged at an inner surface of the tube; and an external transducer housing element arranged at an outer surface of the tube, and wherein the internal transducer housing element and/or the external transducer housing element are arranged to extent through the transducer hole in the wall of the tube and to engage, such that the transducer housing is fixated to the tube, and wherein the main housing is arranged to engage with the transducer housing to constitute a closed meter housing.

The invention is particularly, but not exclusively, advantageous for obtaining a robust and cost optimized consumption meter arranged for ultrasonic measurement of a flow rate. The consumption meter is robust due to the ultrasonic transducers and the control circuit being enclosed in the same meter housing. The consumption meter is cost optimized in that the meter housing is arranged to be attached directly to the wall of the tube by the internal transducer housing element and the external transducer element. Thus no expensive adaption of a prefabricated tube is required in order to attach or fixate the meter housing to the tube.

Further the consumption meter is advantageous in that the transducer housing elements may be attached to the tube in a first production step and the main housing may be attached in a later step. Thereby a flexible production process is achieved, including multiple sub-assemblies and variants of the main housing which may include variants of the control circuit, battery, communication interface, display etc enclosed by the main housing.

The consumption meter is arranged to measure the flow rate of a fluid flowing in the tube between the inlet and the outlet. The signal according to the flow rate may also be an accumulated volume of the fluid or a time series of accumulated volumes.

The meter housing may be a water tight and/or sealed enclosure. This has the effect that the consumption meter may be used in humid environments or even when submerged. The water tight sealed meter housing enclosing at least control circuit, ultrasonic transducers, battery and communication interface has the advantage of being a self-contained robust element of the consumption meter. The meter housing being a water tight and/or sealed enclosure may be construed as the meter housing being a hermetically sealed or hermetically closed enclosure whereby water ingress into the meter housing is prevented. The meter housing may have sealing means arranged between at least some parts of the meter housing to prevent water ingress to ensure that the meter housing is a water tight enclosure. The sealing means may be O-rings, gaskets or other suitable sealing means. Alternatively the parts of the water tight meter housing may be connected by gluing or welding to provide a water tight meter housing.

The consumption meter may have a tube which is a welded tube or a seamless tube. Prefabricated tubes which have a low cost are typically of the welded or seamless tube type. Prefabricated tubes has the advantage of being cost efficient compared to custom made tubes. By a prefabricated tube is understood a preferably cylindrical shaped tube which is fabricated and foreseen for multiple different purposes. Prefabricated tubes are a standard commodity and as such not fabricated for a specific purpose, often it is fabricated according to a set of standards or standard dimensions.

The consumption meter may have a tube which is provided as a tube section provided with flange-elements in opposite ends. Cutting up a prefabricated welded or seamless tube in sections of suitable lengths and providing the sections with flanges is a well-known process whereby a low cost tube may be provided.

The consumption meter may have a tube which has a substantially cylindrical shape and a substantially smooth inner surface and outer surface, as is the case for a wide variety of prefabricated tubes. The Tube has no special formed seats for receiving the transducer housings. The transducer housings are received by the curved surface of the prefabricated tube. The prefabricated tube is not modified for receiving the transducers except for cutting transducer holes in the wall of the tube.

The internal transducer housing element being arranged at an inner surface of the tube is not restricted to the internal transducer housing element having directly contact to the inner wall. Sealing means such as a gasket or a O-ring may be arranged between the internal transducer housing element and the internal surface of the tube. In the same way sealing means may be provided between the external transducer housing element and the outer surface of the tube.

The consumption meter may further comprise a levelling plate between an outer surface of the tube and the external transducer housing element. A levelling plate placed between the external transducer housing element and the outer surface of the tube has the advantages that the external transducer element is pressed against a plane when engaging with the internal transducer housing element. Further, this has the advantage that the external transducer housing element may be arranged to be connected to the internal transducer housing element by rotating the external transducer element.

The external transducer housing element being arranged at an outer surface of the tube is to be construed as including an embodiment with a levelling plate between the external transducer housing elements and the outer surface of the tube. As such the external transducer housing element may comprise a levelling plate arranged to interface the outer surface of the tube.

The main housing may be arranged to engage with the external transducer housing element. In that case the meter housing may be sealed by sealing means between the internal transducer housing element and the external transducer housing element and between the external transducer housing element and the main housing.

To enable engagement of the external transducer housing element and the main housing the transducer housing or the main housing may comprise a union nut arranged for engaging the transducer housing and the main housing.

Alternatively the meter housing is sealed by sealing means between internal transducer housing element and the main housing. This has the advantage that the number of sealing means are reduced.

The consumption meter may be provided with sealing means between the internal transducer housing element and the inner surface of the tube, whereby leakage of fluid from the tube through the transducer hole is prevented.

The ultrasonic transducer is mounted on an inner surface of the internal transducer housing element and the transducer housing may further comprise a transducer interfacing element arranged to apply a force to the ultrasonic transducer, to improve contact between the ultrasonic transducer and the inner surface of the internal transducer housing. The transducer interfacing element may comprise a resilient element and transducer contacts arranged to create electrical connection to the ultrasonic transducer. The main housing may be arranged to apply a force to the transducer interfacing element and the control circuit automatically connects to the transducer contacts when the main housing is mounted on the transducer housing. This has the advantage of allowing an easy and simple production process requiring no mounting of wires between the transducers and the control circuit. Further the automatic connection of the interfacing element to the control circuit prevents production errors. The transducer interfacing element may be fixated between the internal transducer housing element and the external transducer housing element, whereby it is prevented from falling out when the main housing is not mounted.

The consumption meter may have a sleeve is arranged inside the tube. The sleeve has the advantage of improving the measurement accuracy.

BRIEF DESCRIPTION OF THE FIGURES

The consumption meter according to the invention will now be described in more detail with regard to the accompanying figures. The figures show one way of implementing the present invention and is not to be construed as being limiting to other possible embodiments falling within the scope of the attached claim set.

FIG. 2a-2c show a cross section of a consumption meter cut through as indicated by the line on FIG. 2a;

DETAILED DESCRIPTION OF AN EMBODIMENT

Figure 1:
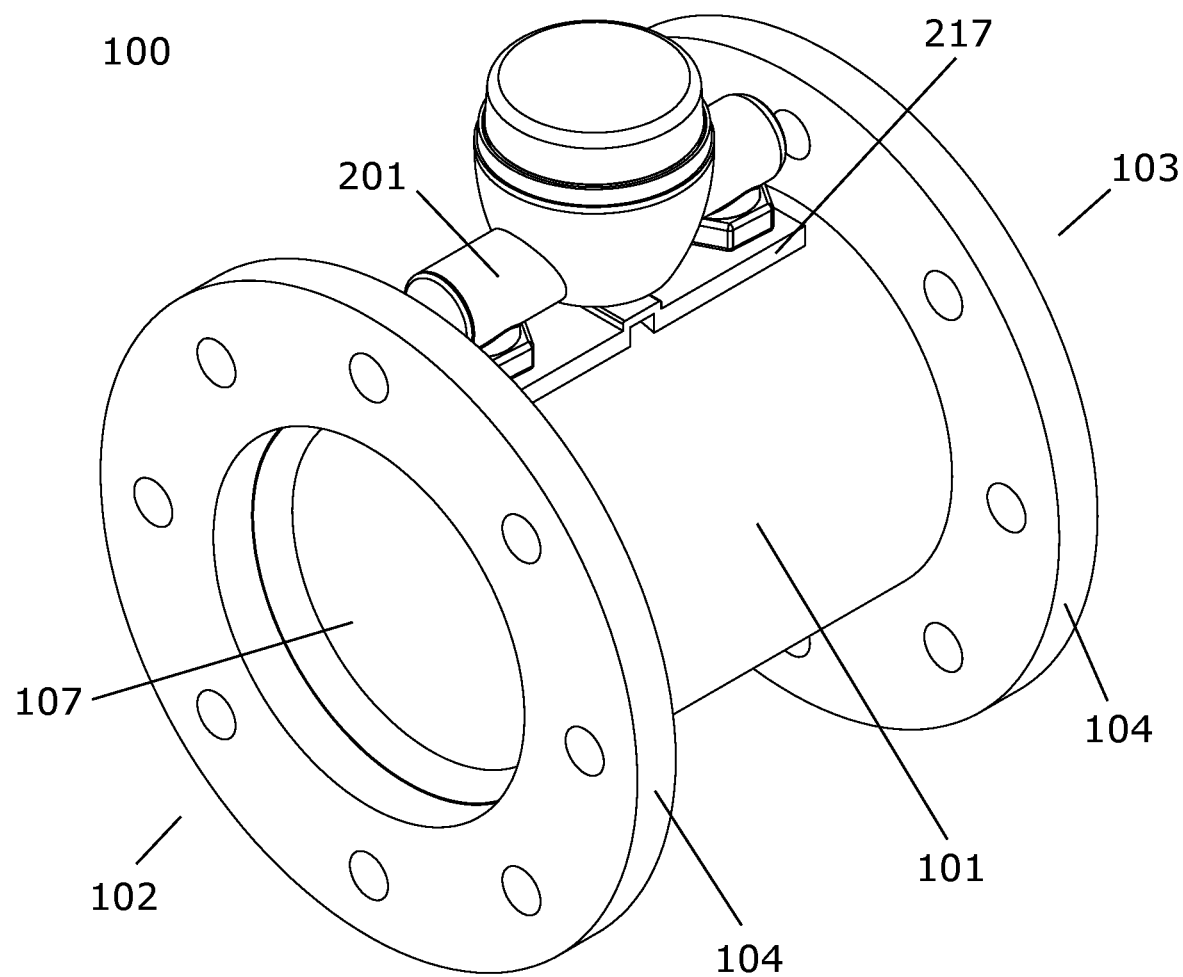
FIG. 1 shows a consumption meter including a meter housing and a tube.
Figure 2A:
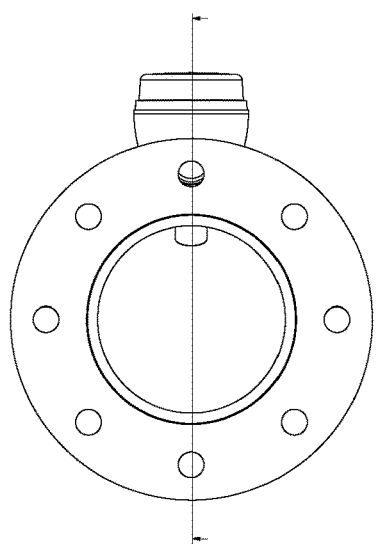
Figure 2B:
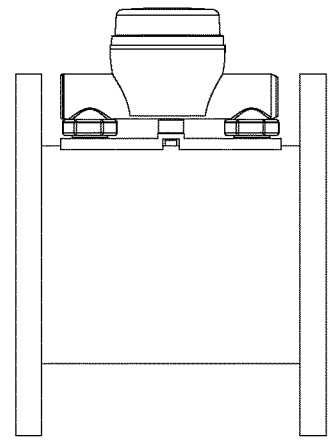
Figure 2C:
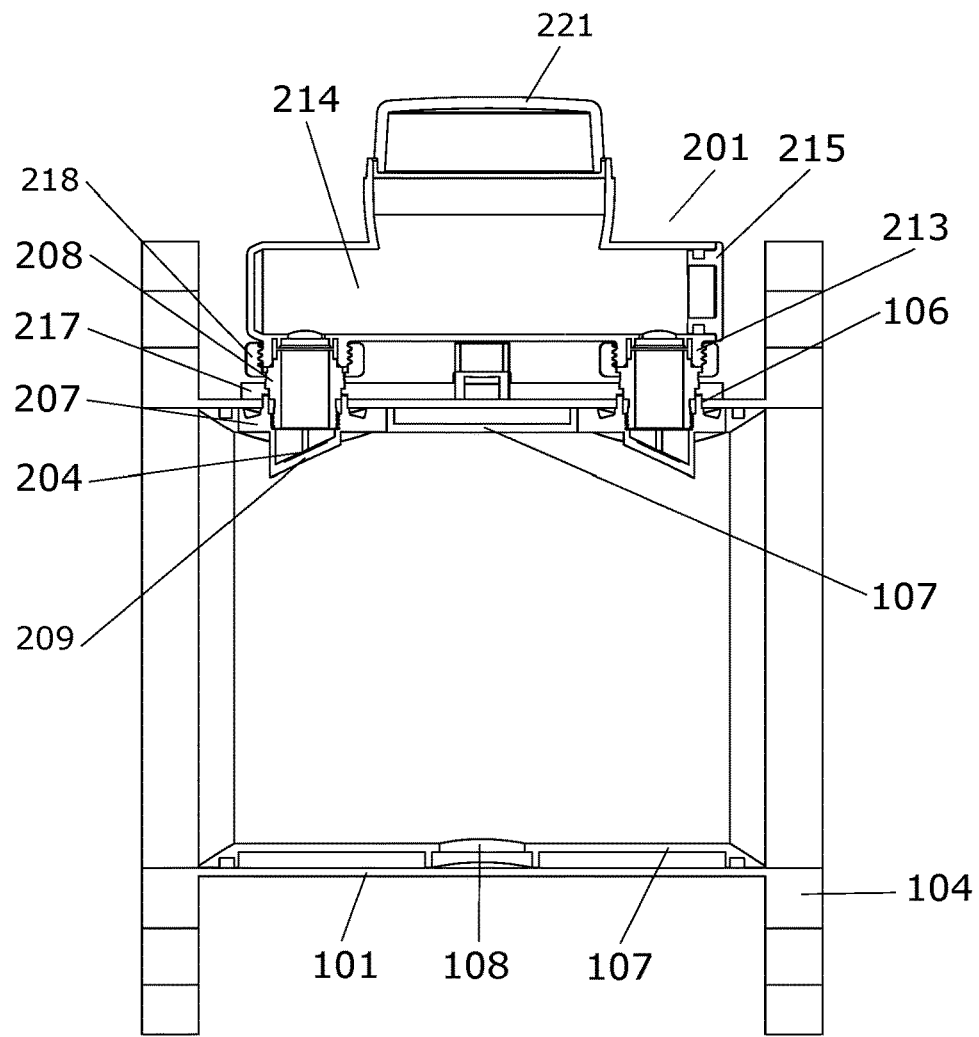

Now referring to FIGS. 1, 2, 3 and 4 a first embodiment of a consumption meter 100, including means for ultrasonic flow measurements is described.

The consumption meter 100 comprises meter housing 201 and a tube 101 which comprises an inlet 102, an outlet 103, a cavity for conducting a fluid flowing in the tube and flanges 104 arranged at each end of the tube for connecting the consumption meter to the piping of an installation site.

The meter housing 201 is a sealed water tight housing comprising a main housing 202 and two transducer housings 203. The meter housing is arranged to enclose at least a set of ultrasonic transducers, a control circuit and a battery. The housing may further enclose one or more communication interfaces.

The tube 101 is prefabricated and may be a welded or seamless tube. The prefabricated tube is cut up in suitable lengths and transducer holes are cut in a wall of the tube. Flanges 104 are welded to the tube endings.

The water tight meter housing 201 is mounted on the tube 101 in that the two transducer housings 203 are arranged to extent through the transducer holes 106 of the tube and are arranged to be fixated to the tube wall. The main housing 202 is mounted on the transducer housings 203 after they have been fixated to the wall of the tube.

The meter housing 201 as such becomes a sealed water tight housing mounted directly on a curved surface of a prefabricated tube 101, in which two transducer holes are cut, whereby direct contact between the transducer housing and fluid conducted by the tube is created.

Figure 6:
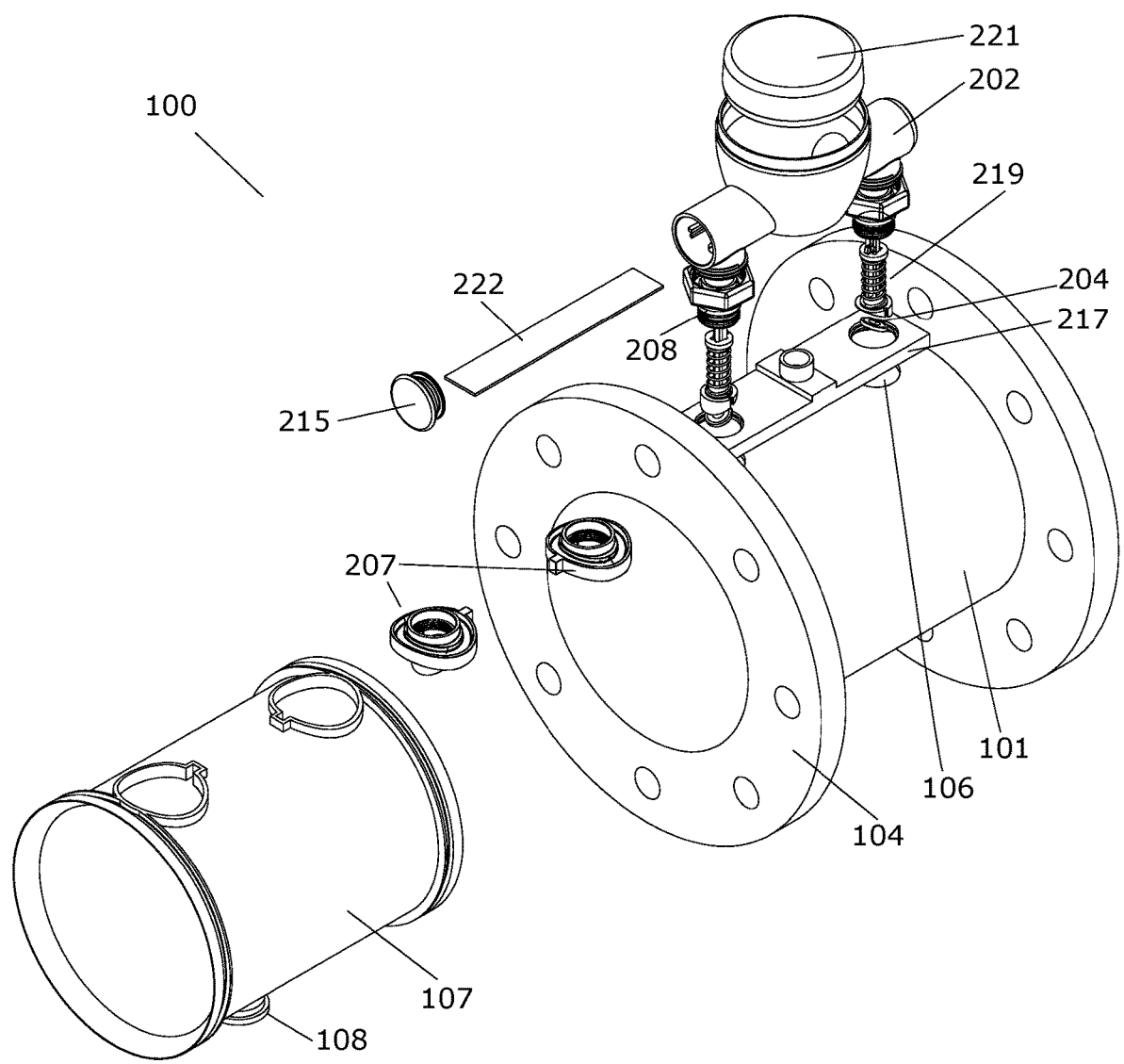
FIG. 6 shows a exploded view of the consumption meter, including elements mounted inside the tube.

The water tight meter housing 201 and the elements enclosed by the meter housing is a self-contained water tight unit that being mounted on the tube constitutes a consumption meter arranged to measure a flow rate of the fluid flowing in the tube. FIG. 6 shows a exploded view of the consumption meter including housing elements.

Direct mounting of a self-contained sealed and water tight unit directly on a curved surface a prefabricated tube makes the consumption meter robust and price optimized.

The tube is made from a prefabricated tube such as a seamless or extruded tube or a welded tube. The tube is made from a metal such as stainless steel, steel, galvanized steel or brass. The tube may be painted or coated. As an alternative the tube may be a moulded tube made from a metal such as cast iron. The tube may as well be made from a polymer.

The tube has a diameter in the range 50-2000 mm, such as in the range of 100-1200 mm.

The prefabricated tube may be, but is not limited to, a standard tubes designed and produced according to EN ISO 1127:1997 or ANSI/ASME B 36.19:2004 or ASTM A 530:2018 or ASTM B677:2016

Flanges 104 are mounted at the tube endings to enable installation of the consumption meter, whereby it is easily connected to a piping installation of a consumption site such as a domestic house, a factory, a part of a processing equipment or any kind of production facility. The flanges may be mounted at the tube endings by a welding process. Alternatively or additionally the tube endings may be formed/machined or milled to create flange endings.

As an alternative to flanges the tube endings may have threading to enable easy connection of the consumption meter to a piping installation.

Two transducer holes are cut in a wall of the tube e.g. by laser cutting or drilling. The transducer holes are arranged on a line along the wall of the tube parallel to a centre line of the tube. The centre line extending through the centre of the tube from the inlet to the outlet. This means that the transducer holes are made on the same side of the tube. The distance between the transducer holes is in the range of 50-500 mm, such as in the range of 100-200 mm.

A sleeve 107 is arranged inside the tube 101. The sleeve reduces the inner diameter of the tube. The sleeve has holes arranged to match the transducer holes in the tube. The transducer housings 203 extend into the holes in the sleeve. The sleeve fixates the internal transducer housing element 207 to prevent rotation around the centre of the transducer holes. Sealing means are arranged between an outer surface of the sleeve and the inner surface of the tube, to minimize flow in the space between the sleeve and the tube. The sleeve 107 is arranged to allow fluid entering the space between the outer wall of the sleeve 107 and the inner wall of the tube 101. Reflectors 108 for reflecting ultrasonic signals are arranged on an inner surface of the sleeve 107. As an alternative the sleeve may only extend in a section between the transducer holes, in that case no holes for the transducer housings are needed in the sleeve.

Since the tolerances on prefabricated tubes used for the tube may be large, the accuracy of the flow measurement may be affected. To improve measurement accuracy the sleeve 107 has smaller tolerances than the tolerances of the tube, whereby measurement accuracy is improved. The sleeve may be made from metal such as stainless steel or polymer such as a fibre reinforced polymer.

The meter housing 201 comprises a main housing 202 and a transducer housing 203. The two parts of the housing are connected/engaged by a sealed water tight connection.

The meter housing is arranged at the tube 101. The transducer holes 106 in the tube are arranged for receiving the meter housing 201 such that the transducer housing 203 extends into or through the transducer holes whereby contact between the transducer housing and the fluid in the tube is created.

The main housing 202 comprises a cavity 214, a lid 215 and two stubs 213. The cavity 214 encloses a battery for supplying a control circuit also enclosed by the main housing, both are not shown on the figures. The control circuit comprises a printed circuit board 222, a micro controller and a transducer interface circuit for exiting ultrasonic transducers and for receiving signals received by ultrasonic transducers 204. A desiccant may be arranged inside the cavity to prevent condensation of water inside the meter housing. The desiccant material may silica gel. The main housing comprises a hollow cylindrical shaped element, which is closed in one end and has an opening in the other end. A lid 215 is arranged in the open end to ensure a water tight closure of the opening of the opening of the main housing. There may be sealing means such as a O-ring (not shown) in a space 216 between the lid 215 and the main housing 202. The lid is attached to the main housing by a snap lock function comprising protrusions and/or indentations on the lid and on the main housing. Alternatively the lid may be glued or ultrasonic welded to the main housing or the main housing.

Figure 3A:
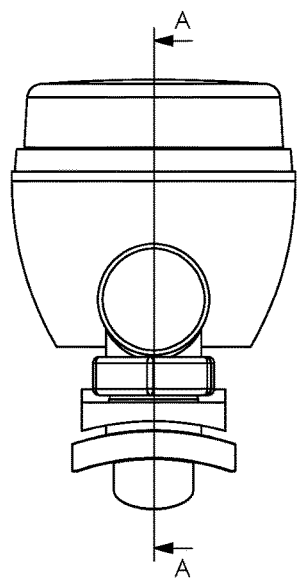
FIG. 3a-3c show a cross section of a cylindrical shaped meter housing with an annex.
Figure 3B:
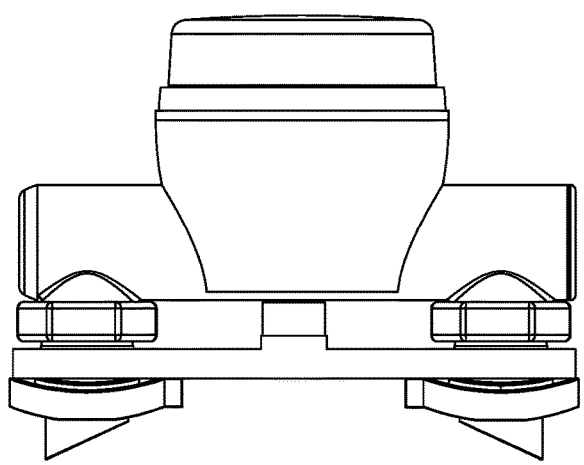
Figure 3C:
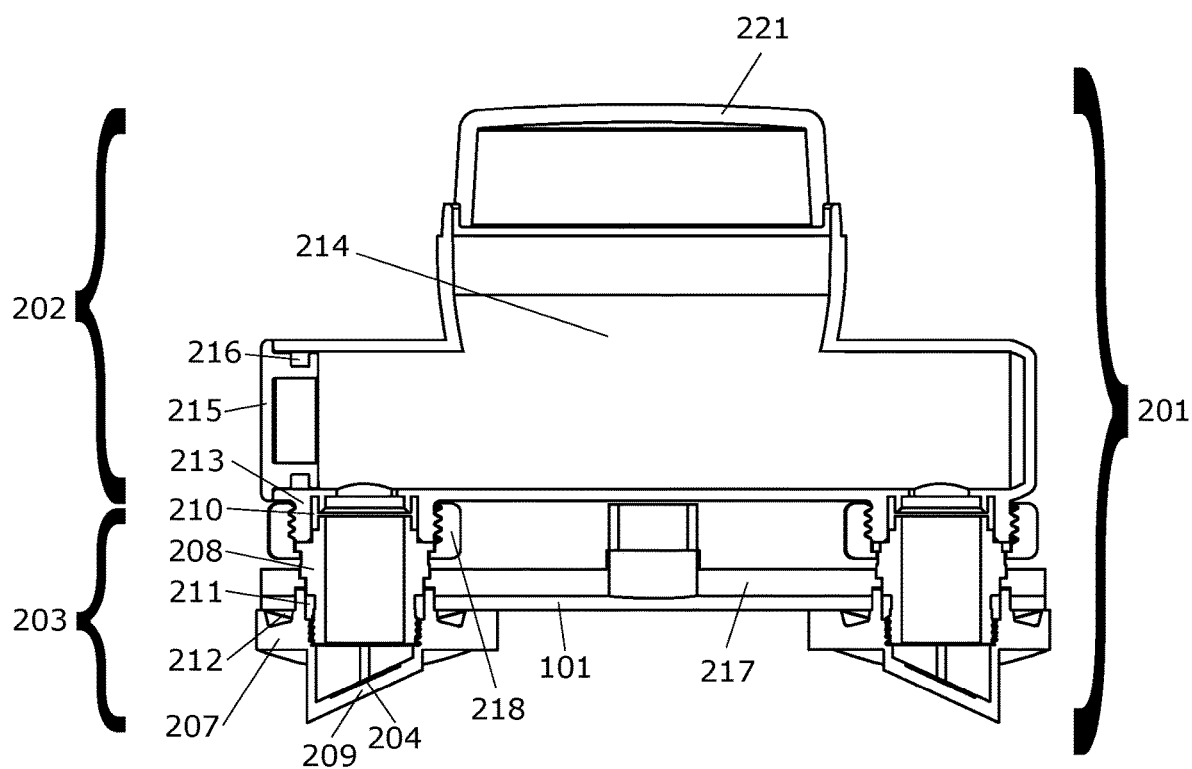
Figure 4A:
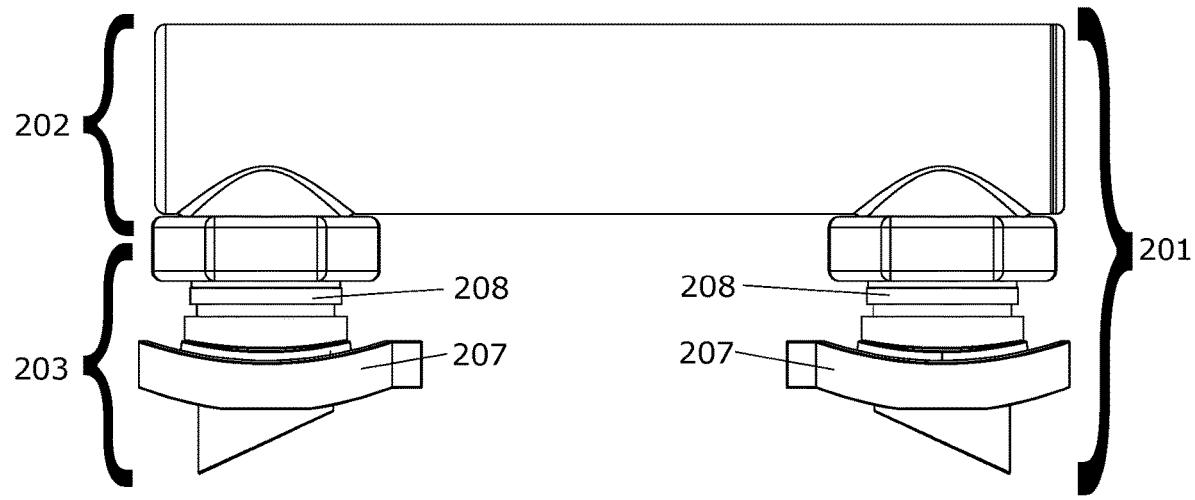
FIG. 4a-4b show a cross section of a cylindrical shaped meter housing including a transducer interface.
Figure 4B:
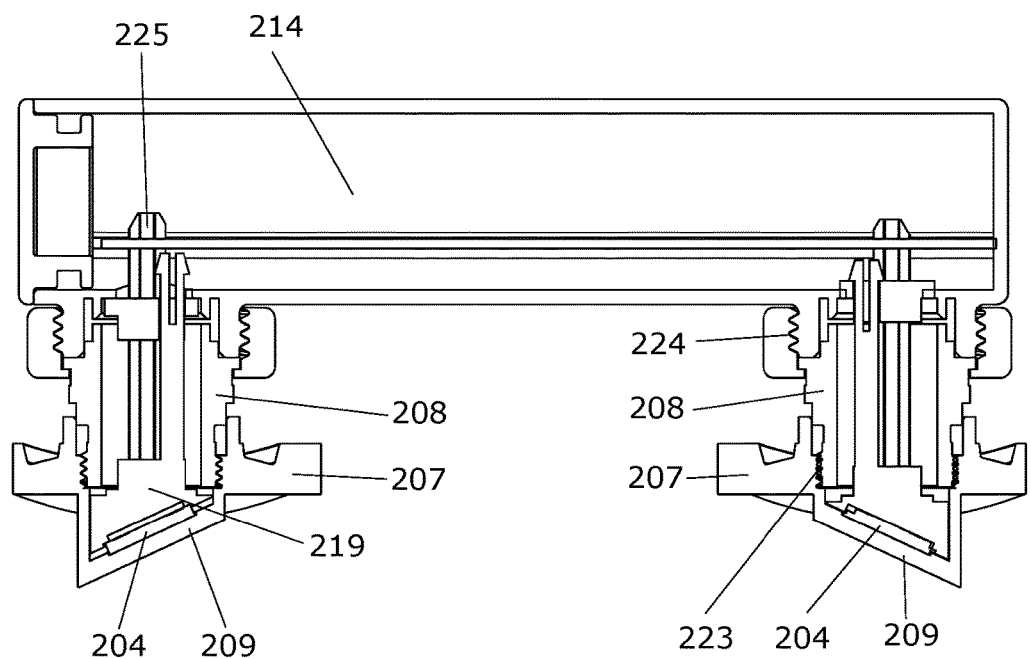

The main housing may have various shapes. FIG. 4a-4b shows a main housing being a simple cylindrical shape whereas FIG. 3a-3c show a main housing also comprising an annex arranged for housing a display and further electronic circuits. The main housing may further enclose an antenna for wireless communication. The annex may also comprise a lid 221 which engage the annex to ensure a sealed water tight closing of the annex. The lid is attached to the main housing by a snap lock function comprising protrusions and/or indentations on the lid and on the main housing. The lid may be attached to the annex by a locking ring. Alternatively the lid may be glued or ultrasonic welded to the main housing or the main housing. The lid 221 of the annex may be at least partly transparent so as to make a display arranged inside the annex visible. A transparent lid 221 further has the advantage of enabling optical communication interfaces. The main housing with the annex has a common cavity 214.

The two stubs 213 on the main housing are hollow cylindrical structures arranged to create an opening into the cavity 214 of the main housing 202. The stubs 213 are arranged to engage with the transducer housing 203. The stubs create a channel from the transducer housing to the cavity of the main housing through which the ultrasonic transducers are electrical connected to the control circuit.

The transducer housing 203 is a hollow element arranged to house at least an ultrasonic transducer 204 and electrical connections to the transducer. The transducer housing comprises a resonance window 209 through which the ultrasonic transducer is arranged to transmit and receive ultrasonic signals propagating through fluid flowing in the tube. The transducer housings 203 and the main housing 202 create one common water tight and sealed enclosure or cavity after being engaged.

The transducer housing 203 comprises an internal transducer housing element 207 arranged at an inner surface of the tube 101 and an external transducer housing element 208 arranged at an outer surface of the tube. The internal transducer housing element 207 and the external transducer housing element 208 are arranged to engage through a transducer hole 106 in the wall of the tube 101, whereby the transducer housing 203 is fixated to the tube. The dimensions of the transducer housing elements and the transducers holes are arranged to prevent the transducer housing elements from passing all the way through the transducer holes. The two elements of the transducer housings each have a threaded part 223 allowing the external transducer housing element 208 to be screwed/rotated to engage with the internal transducer housing element 207. The internal transducer housing element 207 has a surface with a curvature matching the curvature of the tube 101 whereby rotation of the internal transducer element is at least partially prevented or limited when arranged at the inner surface of the tube 101. Further the sleeve 107 prevents or at least reduces rotation of the internal transducer housing element 207 when engaging with the external transducer housing element. When screwing/rotating the external transducer housing element to engage with the internal transducer housing element the transducer housing is fixated to the tube. The transducer housing is fixated to the tube in that a surface of the internal transducer housing element 207 is pressed against the inner surface of the tube 101 and a surface of the external transducer housing element 208 is pressed against the outer surface of the tube when the two elements of the transducer housing 203 engages. The internal transducer housing element and the external transducer housing element are pressed against the inner and outer surface of the tube, respectively, whereby the transducer housing is fixated to the tube.

An levelling plate 217 may be placed between the external transducer housing element 208 and the tube 101. The levelling plate has on one side a curvature matching the curvature of the outer surface of the tube and has a flat surface on the other side matching a surface of the external transducer housing element 208. The levelling plate 217 further has a hole arranged in relation to the transducer holes. When the two elements of the transducer housing 207, 208 engages through the transducer hole 106 and through the hole in the levelling plate, to fixate the transducer housing 203 to the tube 101, the internal transducer housing element 207 is pressed against the inner surface of the tube 101 and a surface of the external transducer housing element 208 is pressed against the levelling plate 217 which is pressed against the outer surface of the tube.

As an alternative to engaging the two transducer housing elements by rotating one of the elements the elements may be engaged by a snap lock function arranged to lock the internal and external transducer housing elements when pressed together through the sensor holes to engage whereby the transducer housing is fixated to the tube. As yet another alternative the two transducer housing elements may be engaged by use of any suitable fastening means such as screws, bolts, ultrasonic welding or gluing.

The two elements of the transducer housing are connected/engaged in a sealed water tight connection.

The main housing 202 is arranged to engage with the external transducer housing elements 208 to constitute a closed and sealed water tight meter housing 201. The two stubs 213 of the main housing 202 are arranged to engage each of the two external transducer housing elements 208. The stubs 213 has a threaded part 224 arranged for engaging with a union nut 218 arranged on the external transducer housing element 208. The union nut 218 is mounted on the external transducer housing element before it is engaged with the internal transducer housing element. As an alternative to engaging the external transducer housing element and the main housing by use of a union nut 218, the elements may be engaged by a snap lock function when pressed together. As yet another alternative they may be engaged by use of any suitable fastening means such as screws, bolts, ultrasonic welding or gluing.

The elements 202, 207, 208, 215, 221 of the of the meter housing 201 are connected or engaged using sealing means such as O-rings or gaskets. The sealing means are not shown on the figures.

The sealing means may be made from rubber or fibre materials. Further, sealing means are provided between the internal transducer housing element 207 and the inner surface of the tube 101, to prevent fluid flowing from the tube through the transducer holes. To enable use of sealing means such as O-rings indentations in the housing elements are provided 210, 211, 212, 216, 304 to ensure sufficient space for the sealing means.

The consumption meter 100 is arranged to measure a flow rate of the fluid in the tube 101 by use of the known operation principle for transit time flow meters, where ultrasonic signals are emitted at one ultrasonic transducer and received at the other ultrasonic transducer, and where the difference in time-of-arrival between oppositely propagating signals is measured and converted into a flow rate by the control circuit. Ultrasonic flow meters using the transit time or time of flight principle are well known within the art.

The consumption meter comprises two ultrasonic transducers 204, such as piezoelectric transducers which are operated by the control circuit. Based on the involved signals the control circuit generates a signal or value indicative of the flow rate of the fluid in the tube.

The ultrasonic transducers 204 are mounted at an inner surface of the internal transducer housing element 207. In particular at the inner surface of the resonance window 209. The ultrasonic transducers 204 are excited by the control circuit to generate an ultrasonic signal which propagates through the internal transducer housing element 207 and propagates into the fluid in the tube. The resonance window 209 in the internal transducer housing element enables propagation of ultrasonic signals between the ultrasonic transducers and the fluid in tube. The resonance window ensures acoustic impedance matching between the ultrasonic transducers and the fluid in the tube. Impedance matching is achieved by matching the dimension of the window to the frequency of the ultrasonic signals and to the speed of sound within the material of the internal transducer housing. As an alternative to the resonance window the internal transducer housing may comprise a membrane, such as a metal membrane, shielding the ultrasonic transducers from the fluid within the tube.

Figure 7:
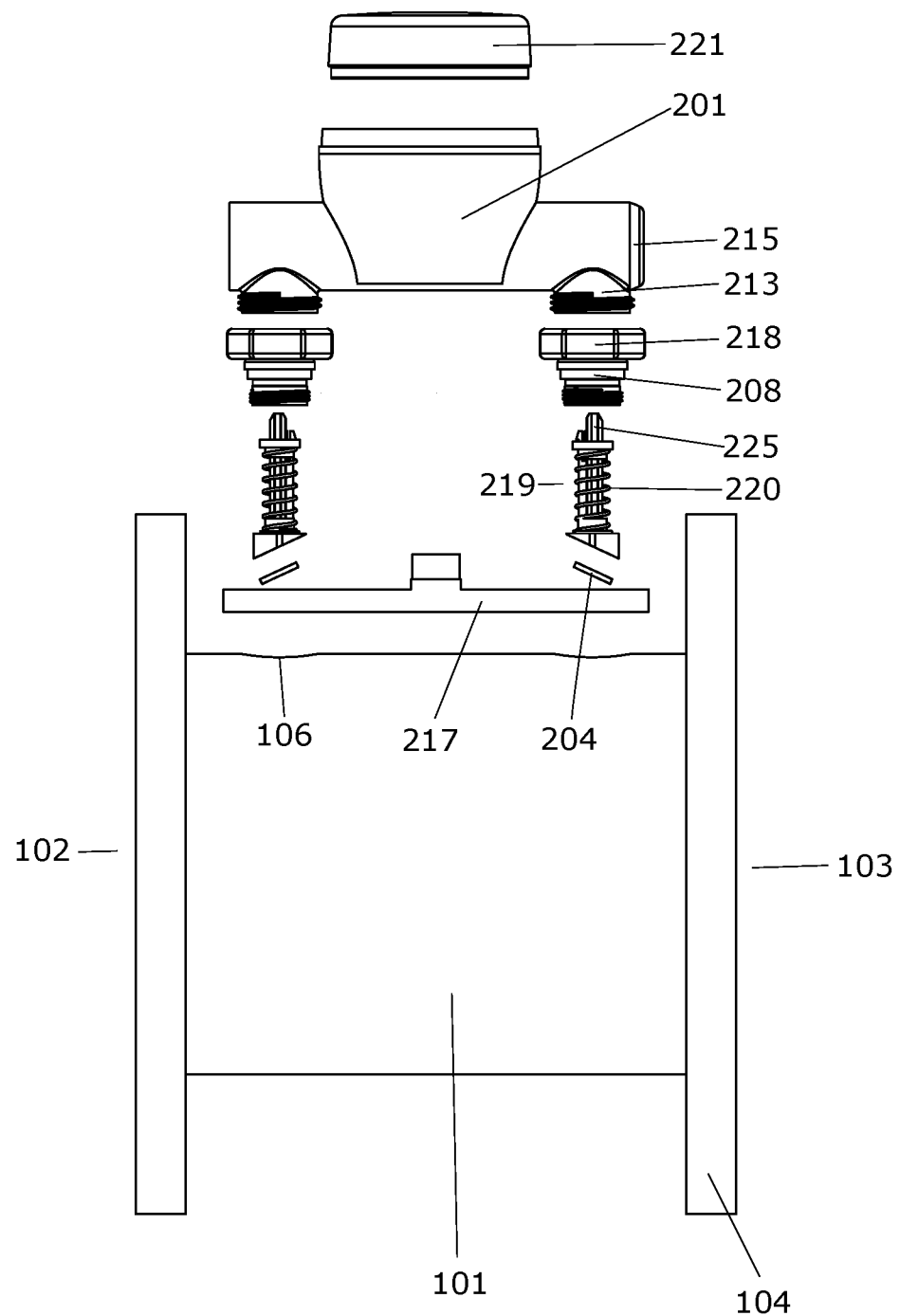
FIG. 7 shows a exploded view of the flow consumption meter including details of the transducer interfacing element.

The ultrasonic transducers 204 are electrically connected to the control circuit by a transducer interfacing element 219, as illustrated on FIG. 6 and FIG. 7. The transducer interfacing element 219 is further arranged to apply a force to the ultrasonic transducer 204, to improve contact between the ultrasonic transducer and the inner surface of the internal transducer housing element 207. The transducer interfacing element comprises a spring 220, when the transducer housing 203 and the main housing 202 engages the spring will be compressed and the transducer interfacing element 219 is arranged to apply a force to the ultrasonic transducer 204, pressing the ultrasonic transducer towards the inner surface of the transducer housing. The transducer interfacing element further comprises transducer contacts 225 arranged to create electrical connection to the ultrasonic transducer when pressed against the transducers. The transducer contacts 225 are further arranged to engage with a printed circuit board 222 of the control circuit. When the main housing 202 and the transducer housing 203 engages the main housing applies a force to the transducer interfacing element 219 and the control circuit automatically connects to the transducer contacts 225 in that the transducer contacts are forced into a slot in the printed circuit board 222 whereby electrical connection between the ultrasonic transducers, the transducer contact and the control circuit is created.

Figure 5A:
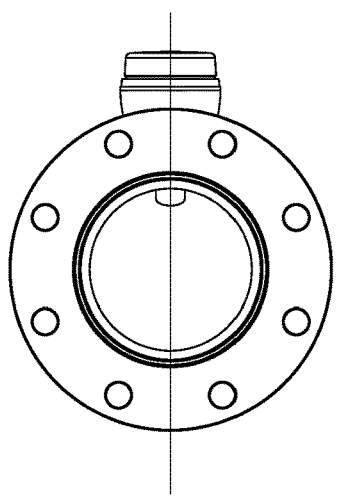
FIG. 5a-5c show a cross section of a consumption meter cut through as indicated by the line on FIG. 5a, the meter housing having a double threaded external meter housing according to the second embodiment.
Figure 5B:
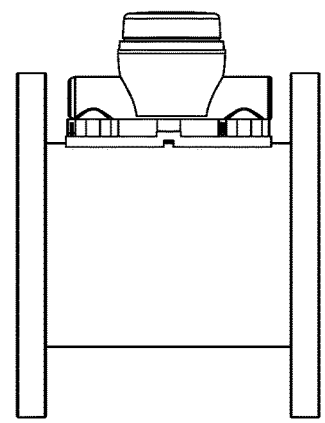
Figure 5C:
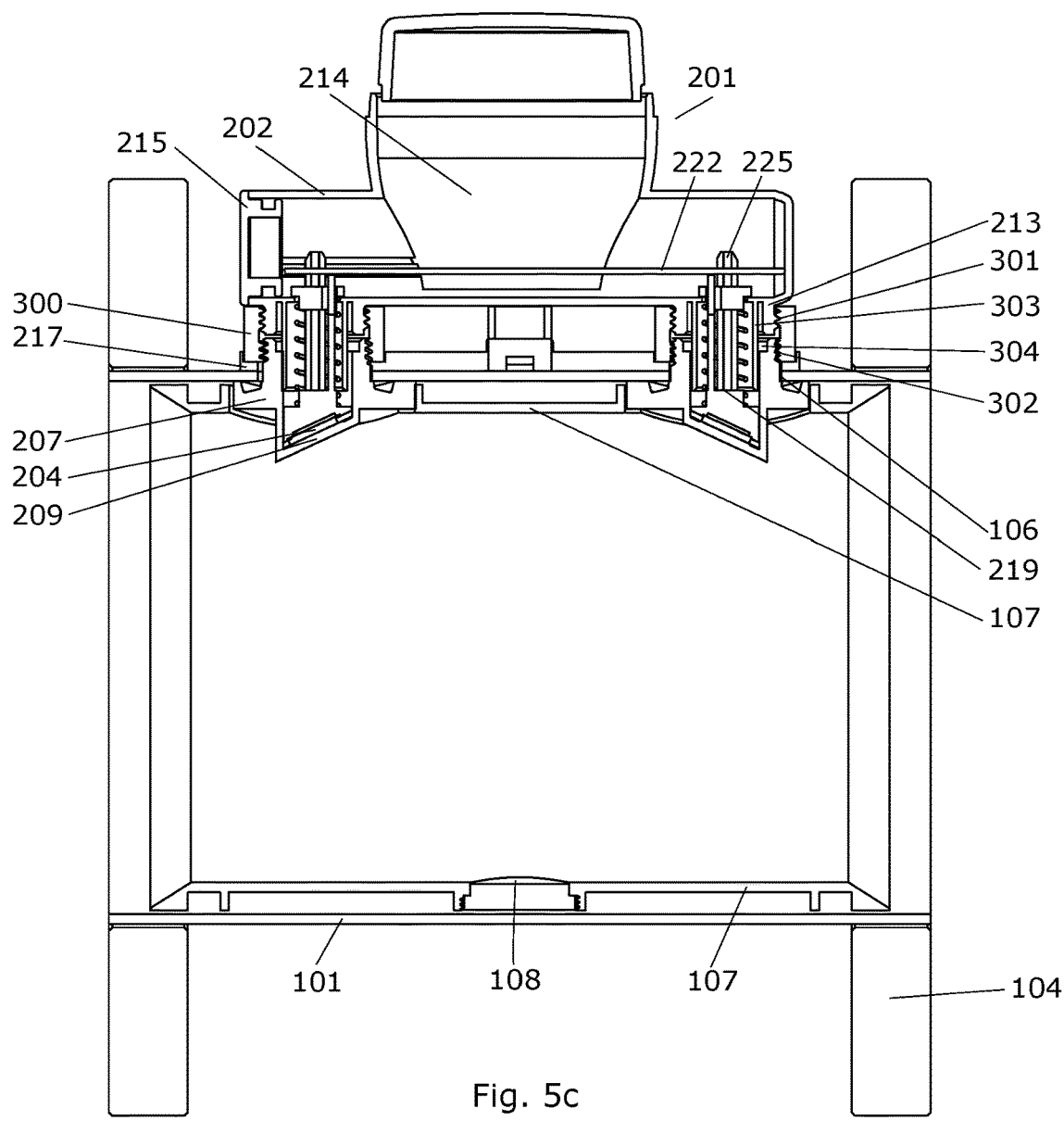
Figure 8:
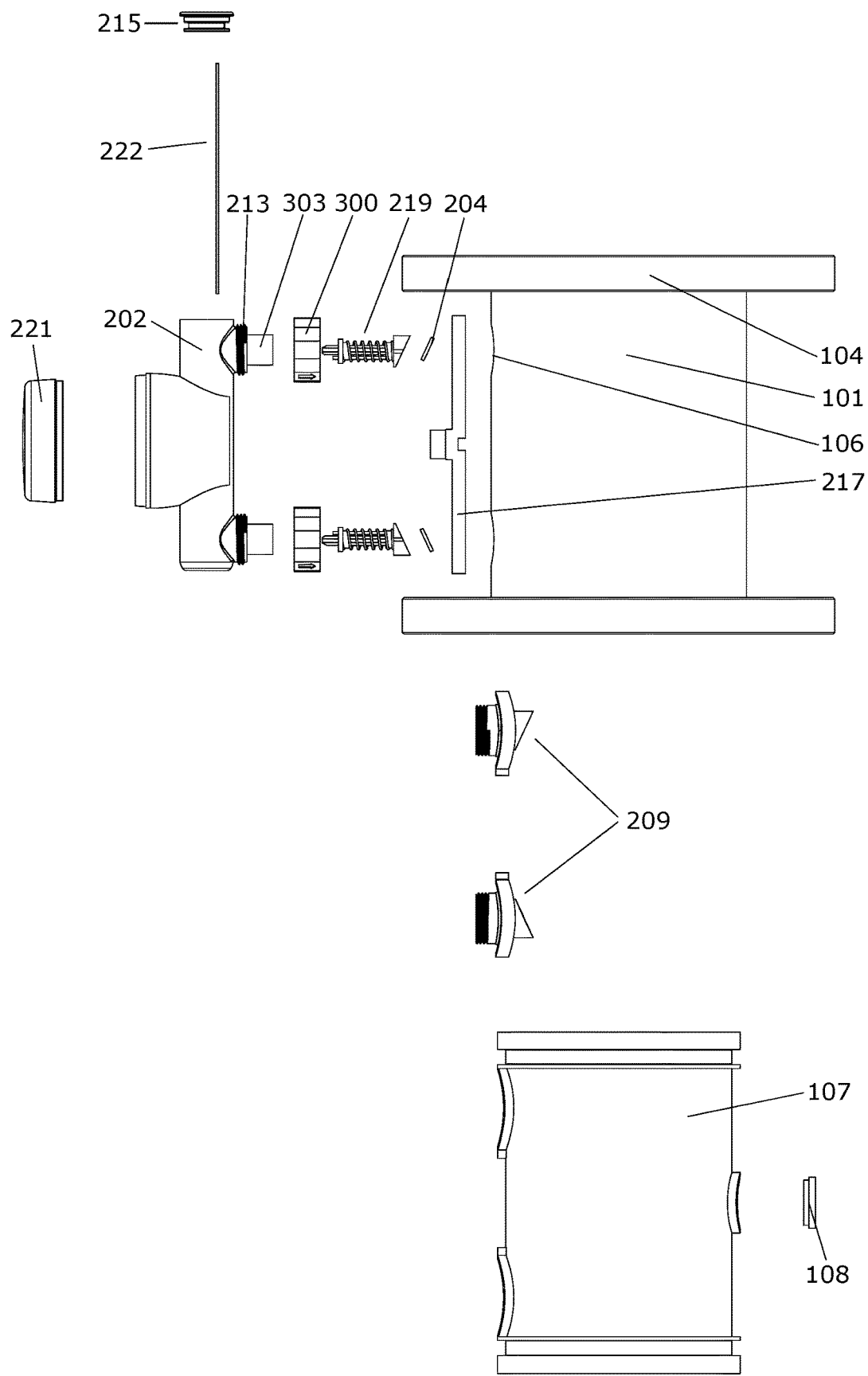
FIG. 8 shows a exploded view of the consumption meter according to the second embodiment, including elements mounted inside the tube.

Now referring to FIG. 5 and FIG. 8 a second embodiment of the external transducer housing element 300 which has two threaded parts is disclosed. The first threaded part 301 having a left hand thread and the second threaded part 302 having a right hand thread. By rotating the external transducer housing element it simultaneously engages with the internal transducer housing element and the main housing. When rotating the external transducer housing element to engage with the internal transducer housing element the transducer housing is fixated to the tube. The transducer housing is fixated to the tube in that a surface of the internal transducer housing element 207 is pressed against the inner surface of the tube and a surface of the external transducer housing element 300 is pressed against the outer surface of the tube when the two elements of the transducer housing engages. A levelling plate 217 may be placed between the external transducer housing element 300 and the outer surface of the tube as described above.

In the second embodiment an extended stub 303 of the main housing is extending into the internal transducer housing element 207. Sealing means such as a O-ring is placed in a space 304 between an inner surface of the internal transducer housing element 207 and an outer surface of the extended stub 303. In the second embodiment the internal transducer housing element 207 and the main housing 202 create one common sealed and water tight enclosure or cavity.

The second embodiment otherwise comprises the same elements and features as the first embodiment and has the same functions and advantages.

The consumption meter may further comprise a wireless communication interface enclosed by the meter housing. The communication interface may be a RF communication interface such as wireless Mbus (EN13757-4:2019), NB IoT, Sigfox, LORA, Near Field Communication, RFID, cellular communication or alternatively proprietary RF interfaces. Other communication interfaces such as inductive or capacitive coupled communication interfaces or optical interfaces may be used. Preferably the antenna or coupling element of the communication interface is enclosed by the meter housing. the No galvanic connection between elements inside the consumption meter housing and external elements is required. The consumption meter housing as such is a self-contained closed unit.

The consumption meter may use the communication interface for transmitting the measured signal indicative of the flow rate to a meter reading device. The consumption meter may further comprise a display controlled by the control circuit. The display may be integrated in the meter housing or be an external display.

The ultrasonic transducers 204 of the consumption meter are arranged at the same side of the tube 101. The transducers does not point directly at each other and propagation of the ultrasonic signals in the tube is be based on reflections. The signals are reflected by reflectors 108 arranged inside the tube 101. Further the transducers are angled relative to a centre line of the tube in an non-perpendicular angle. As an alternative to reflectors the ultrasonic signals may be reflected by the inner wall of the tube. As an alternative to a non-perpendicular angling of the ultrasonic transducers the reflectors may be angled. The use of reflectors inside the tube and angling of ultrasonic transducers and reflectors are well known within the art.

The meter housing elements are made from a polymer material or alternatively a composite material. As an alternative the meter housing or parts of the housing may be made from a metal such as stainless steel, brass or another suitable metal. The main hosing may be made from a polymer while one or both of the transducer housing elements is made from a metal.

The meter housing elements may be made from a polymeric material selected from, but is not limited to, the group comprising polyphenylene sulphide (PPS), polyether sulphone (PES) and Polyether Sulphone (PSU).

It is noted that the properties of the polymeric materials can be customized by adding certain additives prior to the moulding process, affecting the material properties such as stiffness, density or the acoustic impedance. Examples of potential additives include reinforcement materials such as glass fibres, density increasing fillers such as chalk (calcium carbonate, CaCO3) or powdery stainless steel raising the acoustic impedance of the material.

The consumption meter may be any type of utility meter such as a water meter for cold and/or hot water, gas meter, heat meter, cooling meter, energy meter or smart meter. The consumption meter may be used in connection with district heating, district cooling and/or distributed water supply or gas supply. An energy meter may include one or more temperature sensors to calculate the thermal energy in the fluid flowing through the tube into and/or out of a consumption site whereby the energy consumption can be calculated.

The consumption meter may be a legal meter, i.e. a meter which is subdued to regulatory demands. Such regulatory demands may be demands to the precision of the measurements.

The control circuit of the consumption meter is arranged in the meter housing and arranged to measure a flow rate of the fluid flowing through the cavity of the tube and to generate a signal indicative of the flow rate. The signal indicative of the flow rate may be communicated via the communication interface or displayed on an optional display.

Ultrasonic flow meters measure the flow rate in a path of propagation of the ultrasonic signal from one ultrasonic transducer through the fluid to another ultrasonic transducer. This means that only the flow velocity of the fluid within sections of the cavity covered by the path of propagation is included in the measurement. To ensure sufficient accuracy of the flow measurement, multiple sub-flow measurements having different paths of propagation may be performed. The sub-flow measurements are performed by individual sub-flow meters integrated in multiple meter houses, which are distributed over the circumference of the tube, to cover different sections of the cavity. The use of multiple flow meters is especially relevant for larger scale flow meters.

The number of flow meters depend on the size of the tube and, the required accuracy and the flow profile. A typical consumption meter may comprise up to 5 flow meters but for large scale high precision consumption meters up to 10 flow meters may be required to achieve a desired accuracy.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A consumption meter arranged to measure a flow rate of a fluid, the consumption meter comprising:
   a tube comprising a through-going opening for passage of the fluid between an inlet and an outlet and two transducer holes in a wall of the tube;
   a sleeve arranged inside the tube with two second transducer holes in a wall of the sleeve;
   a meter housing arranged at the tube, comprising two transducer housings and a main housing;
   first and second ultrasonic transducers arranged in the transducer housings for transmitting and receiving ultrasonic signals propagating through the fluid; and
   a control circuit arranged in the meter housing for operating the first and second ultrasonic transducers, and being arranged to generate a signal according to the flow rate of the fluid,
   wherein the transducer housing comprises:
     an internal transducer housing element arranged at an inner surface of the tube; and
     an external transducer housing element arranged at an outer surface of the tube,
   wherein at least one of the internal transducer housing element or the external transducer housing element is arranged to extend through the transducer hole in the wall of the tube and to engage, such that the transducer housing is fixated to the tube, wherein the internal transducer housing element is arranged to extend through the second transducer hole in the sleeve to prevent rotation of the internal transducer housing element around the center of the second transducer hole, and
   wherein the main housing is arranged to engage with the transducer housing to constitute a closed meter housing.

2. A consumption meter according to claim 1, wherein the meter housing is a water tight and/or sealed enclosure.

3. A consumption meter according to claim 1, wherein the tube is a welded tube or a seamless tube.

4. A consumption meter according to claim 1, wherein the tube is provided as a tube section provided with flange-elements in opposite ends.

5. A consumption meter according to claim 1, wherein the tube has a substantially cylindrical shape and a substantially smooth inner surface and outer surface.

6. A consumption meter according to claim 1, further comprising a levelling plate between an outer surface of the tube and the external transducer housing element.

7. A consumption meter according to claim 1, wherein the main housing is arranged to engage with the external transducer housing element.

8. A consumption meter according to claim 1, wherein the meter housing is sealed by sealing means between the internal transducer housing element and the external transducer housing element and between the external transducer housing element and the main housing.

9. A consumption meter according to claim 1, wherein the transducer housing or the main housing comprises a union nut arranged for engaging the transducer housing and the main housing.

10. A consumption meter according to claim 1, wherein the meter housing is sealed by sealing means between the internal transducer housing element and the main housing.

11. A consumption meter according to claim 1, wherein sealing means are provided between the internal transducer housing element and the inner surface of the tube.

12. A consumption meter according to claim 1, wherein the ultrasonic transducer is mounted on an inner surface of the internal transducer housing element and the transducer housing further comprises a transducer interfacing element arranged to apply a force to the ultrasonic transducer, to improve contact between the ultrasonic transducer and the inner surface of the internal transducer housing.

13. A consumption meter according to claim 12, wherein the transducer interfacing element comprises a resilient element and transducer contacts arranged to create electrical connection to the ultrasonic transducer.

14. A consumption meter according to claim 12, wherein the main housing applies a force to the transducer interfacing element and the control circuit automatically connects to the transducer contacts when the main housing is mounted on the transducer housing.

15. A consumption meter arranged to measure a flow rate of a fluid, the consumption meter comprising:
- a tube comprising a through-going opening for passage of the fluid between an inlet and an outlet and two transducer holes in a wall of the tube;
- a meter housing arranged at the tube, comprising two transducer housings and a main housing;
- first and second ultrasonic transducers arranged in the transducer housings for transmitting and receiving ultrasonic signals propagating through the fluid;
- a control circuit arranged in the meter housing for operating the first and second ultrasonic transducers, and being arranged to generate a signal according to the flow rate of the fluid,
- wherein the transducer housing comprises:
  - an internal transducer housing element arranged at an inner surface of the tube; and
  - an external transducer housing element arranged at an outer surface of the tube,
  - wherein the internal transducer housing element and/or the external transducer housing element are arranged to extend through the transducer hole in the wall of the tube and to engage, such that the transducer housing is fixated to the tube,
  - wherein the main housing is arranged to engage with the transducer housing to constitute a closed meter housing; and
- a levelling plate between an outer surface of the tube and the external transducer housing element.

* * * * *